US006510522B1

(12) United States Patent
Heinrich et al.

(10) Patent No.: US 6,510,522 B1
(45) Date of Patent: Jan. 21, 2003

(54) APPARATUS AND METHOD FOR PROVIDING ACCESS SECURITY TO A DEVICE COUPLED UPON A TWO-WIRE BIDIRECTIONAL BUS

(75) Inventors: David F. Heinrich, Tomball, TX (US); Hung Q. Le, Katy, TX (US); Paul B. Rawlins, Spring, TX (US); Charles J. Stancil, Tomball, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/196,849

(22) Filed: Nov. 20, 1998

(51) Int. Cl.$^7$ ................................................ H04L 9/00
(52) U.S. Cl. ........................ 713/200; 710/126; 710/100; 710/132
(58) Field of Search ............................... 713/200, 201, 713/202; 710/126, 100, 132

(56) References Cited

U.S. PATENT DOCUMENTS

| | | | | |
|---|---|---|---|---|
| 5,202,997 A | * | 4/1993 | Arato | 395/725 |
| 5,594,793 A | * | 1/1997 | Bahout et al. | 380/4 |
| 5,606,315 A | * | 2/1997 | Gaskins | 340/825.34 |
| 5,748,888 A | | 5/1998 | Angelo et al. | |
| 5,841,996 A | * | 11/1998 | Nolan et al. | 395/309 |
| 5,887,131 A | * | 3/1999 | Angelo | 395/188.01 |
| 5,911,042 A | * | 6/1999 | Kugue | 395/188.01 |
| 5,974,513 A | * | 10/1999 | Matsuo et al. | 711/164 |
| 6,038,632 A | * | 3/2000 | Yamazaki et al. | 710/260 |
| 6,138,240 A | * | 10/2000 | Tran et al. | 713/202 |
| 6,145,085 A | * | 11/2000 | Tran et al. | 713/202 |
| 6,199,173 B1 | * | 3/2001 | Johnson et al. | 714/4 |
| 6,233,635 B1 | * | 5/2001 | Son | 710/126 |
| 6,266,721 B1 | * | 7/2001 | Sheikh et al. | 710/100 |

OTHER PUBLICATIONS

ACQURA.COM: 12C Bus Evaluation Boards Copyrighted 2000. pp. 1–2.*

Data Sheet for 128 + 8–bit EEPROM with I$^2$C–bus interface, Phillips Semiconductors, Apr. 1997, pp. 1–19.
"The I$^2$C–bus and how to use in (including specifications)," Phillips Semiconductors, Apr. 1995, pp. 1–24.
Application Note for I$^2$C driver routines for 8XC75 1/2 microcontrollers, Phillips Semiconductors, Jul. 1991, pp. 1–55.

* cited by examiner

Primary Examiner—Gail Hayes
Assistant Examiner—Leynna Ha
(74) Attorney, Agent, or Firm—Kevin L. Daffer; Conley, Rose & Tayon P.C.

(57) ABSTRACT

A computer system, bus interface unit, and method are provided for securing certain devices connected to an I$^2$C bus. Those devices include any device which contains sensitive information or passwords. For example, a device controlled by a I$^2$C-connected device bay controller may contain sensitive files, data, and information to which improper access may be denied by securing the device bay controller. Moreover, improper accesses to passwords contained in non-volatile memory connected to the I$^2$C bus must also be prevented. A bus interface unit coupled within the computer contains registers, and logic which compares the incoming I$^2$C target and word addresses with coded bits within fields of those registers. If the target or word address is to a protected address or range of addresses, then an unlock signal must be issued before the security control logic will allow the target or word address to access the I$^2$C bus or addressed device thereon. The unlock signal can be assigned to a particular slot among numerous slots, wherein the slots are arranged in hierarchical order. This allows a system administrator the capability to unlock accesses to protected non-volatile memory, and thereby allowing the system administrator to change passwords within one portion of non-volatile memory, and possibly allowing a lower priority user to access and change a password within another portion of non-volatile memory. The slot which accommodates an unlock signal assigned to the system administrator is altogether separate from a slot assigned to a non-system administrator or user.

20 Claims, 5 Drawing Sheets

ISC SECURITY MAPPING REGISTER 1 (INDEX 02h, OFFSET 0C-0Fh)

| Bit Field High | Bit Field Low | PwrOn State | Attr | Description |
|---|---|---|---|---|
| 31 | 24 | 00h | W | I2C Device Bay Controller End Address for protected range (Write Once) |
| 23 | 16 | 00h | W | I2C EEROM storage area 2 End Address (Write Once) |
| 15 | 8 | 00h | W | I2C EEROM storage area 1 End Address (Write Once) |
| 7 | 0 | 00h | W | I2C EEROM storage area 0 End Address (Write Once) |

FIG. 7

ISC SECURITY MAPPING REGISTER 2 (INDEX 02h, OFFSET 10-13h)

| Bit Field High | Bit Field Low | Pwr On | Attr | Description |
|---|---|---|---|---|
| 31 | 24 | 00h | W | I2C Device Bay Controller Starting Word Address for protected range (Write Once) |
| 23 | 17 | 0000000b | W | I2C Device Bay Controller Identifier/Slave Address (Write Once) |
| 16 | 16 | 0b | W | I2C Device Bay Controller Bus Bit (Write Once) 0 = I2C Bus 0  1 = I2C Bus 1 |
| 15 | 8 | 00h | W | I2C EEROM Starting Word Address for protected ranges (Write Once) |
| 7 | 4 | 1010b | RO | I2C EEROM Device Type Identifier (hard coded) |
| 3 | 1 | 000b | W | I2C EEROM Hardware Address/Page (Write Once) |
| 0 | 0 | 0b | W | I2C EEROM Bus Bit (Write Once) 0 = I2C Bus 0  1 = I2C Bus 1 |

FIG. 8

APPARATUS AND METHOD FOR PROVIDING ACCESS SECURITY TO A DEVICE COUPLED UPON A TWO-WIRE BIDIRECTIONAL BUS

BACKGROUND OF THE INVENTION

1. Field of the Invention

This invention relates to computer system security and, more particularly, to an apparatus and method for securing against accessing a securable slave device (or address range within the slave device) coupled to an I²C bus.

2. Description of the Related Art

Securing a computer system involves preventing unauthorized access to sensitive data and/or instructions contained within various hardware resources attributed to that system. The terms "instructions" and "data" refer generically to all forms of electronic information, including data entries and files created by the instructions as well as the executable instructions themselves.

Typically a computer system will include a plurality of hardware resources, henceforth referred to as "devices." A group or set of devices may contain sensitive information and therefore must be periodically secured. Alternatively, a device may be an electromechanical mechanism, such as a latch, which prevents unauthorized access to the interior of the computer chassis. Thus, the device is interchangeably referred to as a hardware resource which either contains sensitive information or provides a gateway, or securement, to that information. One form of securement involves a technique of known as "password matching."

Upon reset or boot-up of the computer system, a password stored within non-volatile memory will be entered into volatile memory proximate to a comparator. The previously stored password can then be compared against a user-entered password to determine if the user is allowed access. Typically, the volatile memory which receives the previously stored password, as well as a comparator locally linked to the volatile memory, are contained in what is often referred to as a "black box". Description of a black box security device is generally set forth in U.S. Pat. No. 5,748,888 (herein incorporated by reference).

The password stored in non-volatile memory, and loaded into the black box, is derived from various non-volatile resources. For example, the password can be derived from electrically erasable ROM (EEROM) coupled to a specially designed bi-directional two wire bus, often referred to as the inter integrated circuit (or "I²C") bus. The I²C bus is generally well-known and is set forth, for example, in numerous publications to Phillips Semiconductor Corporation. General purpose circuits, such as liquid crystal display drivers, remote I/O ports, microcontrollers, RAM, and EEROM/EEPROM, can be connected to an I²C bus. The basic protocol and bus specification is described in numerous articles, some of which define electrically erasable or electrically erasable and programmable ROMs coupled to the I²C bus, and containing passwords which are maintained even though power to the computer system is terminated.

Depending on the number of passwords stored in non-volatile memory and then loaded into the black box, at least one comparison can be carried forth. In this fashion, a black box may serve to compare multiple stored passwords against multiple user-entered passwords, the result of each compare being placed on a corresponding conductor or "slot" as a lock or unlock signal. The intent of storing multiple passwords and comparing against those passwords is to provide a hierarchical structure of security. For example, a user may enter a password to gain access to only his or her computer, whereas a system administrator can enter a password mutual to numerous computers across, for example, a network of computers.

Storage of multiple passwords within a non-volatile media connected to an I²C bus presents numerous challenges. Firstly, an I²C bus is typically not securable and therefore can be accessed by undesired personnel. Secondly, once accessed, passwords (or any other information requiring security) that is stored in an I²C memory device can be quickly ascertained thus allowing an unwanted "hacker" to match his or her input to that sensitive information to obviate the security and integrity of not only that computer, but many other computer networked thereto. As defined hereinbelow, the term "password" encompass any and all types of sensitive information and extends beyond the normal definition of a password in general.

If the boot-up operation involves the Basic Input Output System ("BIOS") loading stored password (or passwords) from an I²C non-volatile memory, measures must be taken to protect against improper access to that memory. In addition, if a device other than memory is coupled to the I²C bus and contains sensitive information, that device along with memory must be maintained securable. Thus, not only must memory coupled to the I²C bus be securable, but the I²C bus in general must be securable since other non-memory devices may also contain sensitive information. Still further, measures must be taken to account for multiple passwords stored in separate and distinct regions of the I²C non-volatile memory. Securing one area separate from another will ensure certain passwords will be protected separate from others, and that the potential hierarchical status of those passwords is maintained depending on a particular user seeking access. Thus, while it would be desirable to allow a system administrator access to all areas within I²C non-volatile memory, a single computer user of the system administrator network may only be granted access to only a portion (i.e., one password) of the entire non-volatile memory space. The need for securing an I²C bus, various I²C devices (including non-volatile memory), and securing select portions of an I²C non-volatile memory would prove highly desirable if passwords or other sensitive information is contained upon a specific I²C bus, within an I²C device, or within a portion of an I²C device.

SUMMARY OF THE INVENTION

The problems outlined above are in large part solved by an improved computer security system hereof. The security system encompasses at least one I²C bus and multiple I²C devices connected thereto. Securing those devices is achieved by placing security components within a southbridge of the computer system, or any device within the I²C engine. The southbridge includes a black box having multiple slot outputs, each of which may carry a lock or unlock signal depending on whether comparison of the stored password corresponds with a respective user-entered password. The lock or unlock signal can then be assigned via a slot assignment register to a particular device coupled upon the I²C bus. For example, one slot may be assigned or mapped to a particular I²C device, whereas another slot may be assigned to another I²C device. Yet further, one slot may be assigned to a particular portion of an I²C non-volatile memory device, separate from another slot assigned to an altogether different portion of the same I²C non-volatile memory device.

In addition to the black box and the slot assignment register, the southbridge may also include an I²C controller. The controller contains at least one security mapping register. That register includes fields which have been programmed with I²C slave addresses that are securable, and are also programmed with a word address range that is securable within each of the securable slave addresses. As such, an address of an I²C transaction issued from a processor will be compared against the secured slave addresses and secured word addresses stored within the security mapping registers. Comparison is carried forth in logic, interchangeably referred to as security control logic. If the incoming address matches the protected slave or word address and a corresponding unlock is issued from the slot assignment register, then access is granted to that protected device, or word address range within that device.

The keyboard includes any device into which a user can enter data. Also, the password could simply be implemented as a hash, absent a black box, wherein the hash can be used to decrypt an entered password and compare the decrypted results with the previously stored data.

According to one embodiment, the I²C controller further includes an I²C control unit which responds to a transaction valid signal issued from the security control logic. The transaction valid signal allows passage of the I²C transaction address to the corresponding device. The transaction valid signal will be issued during various circumstances. For example, transaction valid signal will be issued if access is attempted to an unprotected target. This ensues if the I²C transaction address is to a target (or slave) address of an unprotected I²C device. The transaction valid signal will also be issued if access is attempted to a protected slave (protected I²C device); however, access is attempted to a word address outside the protected range of that slave. The transaction valid signal will also be issued if, as stated above, access is attempted to a protected target within a protected word address range; however, the corresponding slot of that target device yields an unlock signal.

According to another embodiment, a computer system is provided incorporating a plurality of securable devices coupled to a two-wire bidirectional bus. The computer system includes a keyboard and a storage unit operably coupled to the keyboard. The storage unit is adapted to produce an unlock signal upon an output conductor (or "slot") of the storage unit if a stored password within the storage unit favorably compares with a password entered upon the keyboard. A controller is operably coupled to the storage unit for allowing access to an address of the securable device upon receiving the unlock signal. According to one embodiment, the controller is an I²C controller, and the securable device is a device coupled to an I²C bus. Thus, the two-wire bidirectional bus is an I²C bus, according to a preferred embodiment. The storage unit may issue several dissimilar unlock signals upon separate and distinct conductors or slots. For example, another unlock signal can be produced to unlock an address range associated with the securable device. In this instance, the securable device is non-volatile memory having a plurality of securable address ranges, each of which can be unlocked separate from the other.

According to yet another embodiment, a bus interface unit is provided. The bus interface unit is coupled to an I²C bus upon which a plurality of I²C devices are connected. The bus interface unit includes a storage unit configured to retain a stored password. A security mapping register is also provided an includes a field of bits which identify a password secured device among the plurality of I²C devices. A comparator is coupled to the storage unit for comparing a user entered password against the stored password and to present an unlock signal from the comparator if the user entered password favorably compares with the stored password. Security control logic is operably coupled between the comparator and the security mapping register for allowing access to the password secured device upon receipt of the unlock signal. The security mapping register may include another field of bits which identify a second password secured device among a plurality of I²C devices connected to a second I²C bus. The security control logic is configured to allow access to a password secured device upon the second I²C bus during receipt of a corresponding unlock signal. The password secured device may comprise, for example, a device bay controller or a non-volatile memory.

According to yet another embodiment, a method is presented for unlocking a plurality of password securable devices. The method includes comparing a user-entered password against a stored password. A target address issued to an I²C device is compared against a field code within a security mapping register to determine if the target address is a password secured address. An unlock signal can then be presented to the I²C device to de-assert lock if the user entered password is the same as the stored password. The user-entered password can be either entered locally or distally from a computer containing the I²C device. Bits within the field code can be fixed to identify the I²C device as a non-volatile memory. Bits can also be programmed within the field code to identify the I²C devices coupled to one of possibly two I²C buses. Yet further, bits within the field code can be programmed to indicate a password secured address range of a password secured I²C device. Separate field codes can be dedicated to separate password secured address ranges. This provides flexibility at which various passwords can be protected depending on the status of a user seeking to gain access. The capability of unlocking one portion or all portions of a secured word address within an I²C non-volatile memory allows the stored password to be updated only by select individuals.

BRIEF DESCRIPTION OF THE DRAWINGS

Other objects and advantages of the invention will become apparent upon reading the following detailed description and upon reference to the accompanying drawings in which:

FIG. 7 is a block diagram of programmable fields within the first security mapping register of FIG. 2; and FIG. 8 is a block diagram of programmable fields within the second security mapping register of FIG. 2.

Figure 1:
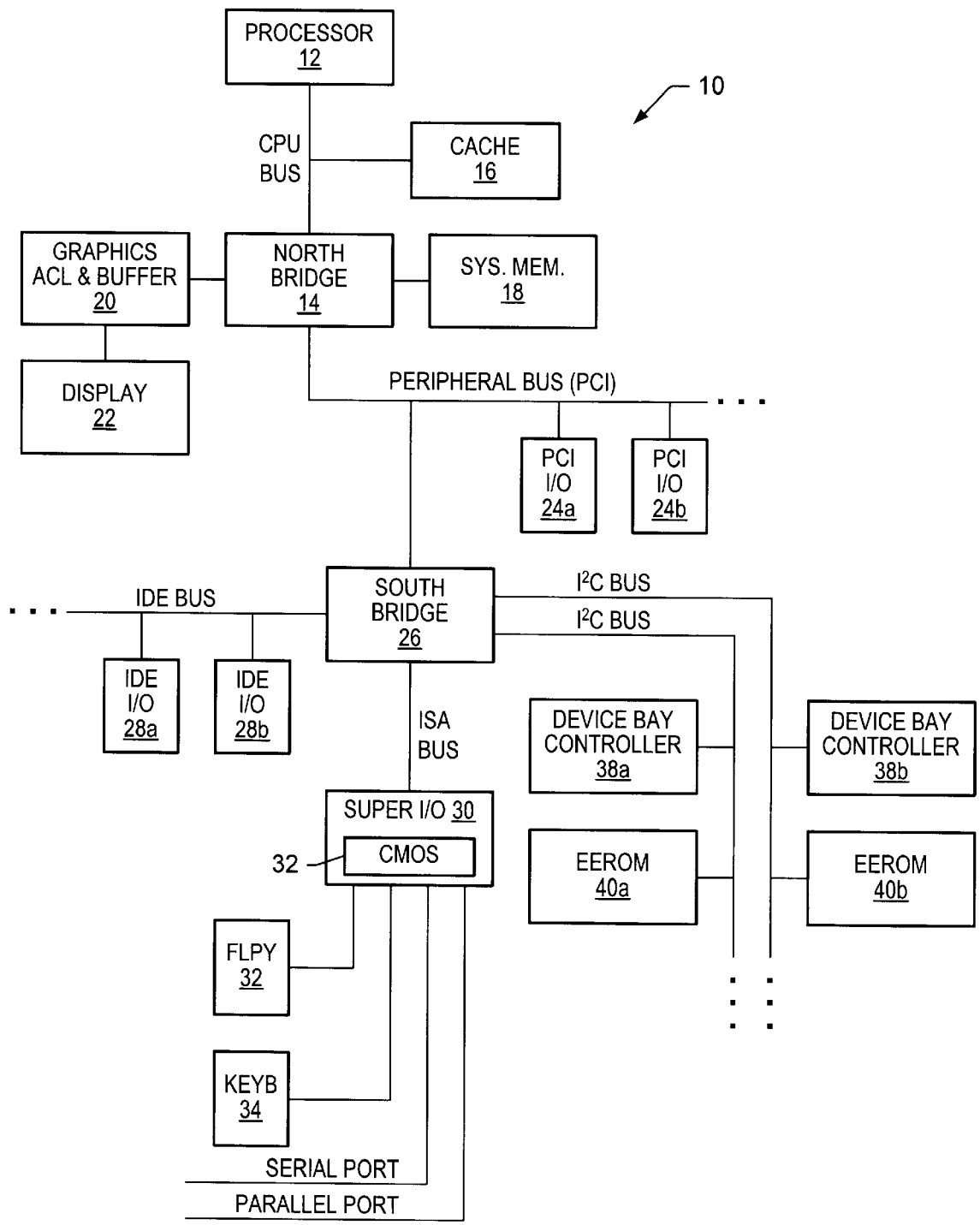
FIG. 1 is a block diagram of a computer system comprising various buses and bus interface units.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning to the drawings, FIG. 1 illustrates a computer 10 having multiple buses, including a CPU bus, a mezzanine or PCI bus, and multiple peripheral buses. In the example shown, the peripheral buses include an ISA/EISA bus, an IDE bus and a $I^2C$ bus. The CPU bus connects a CPU or processor 12 to a bus interface unit or northbridge 14. A cache memory 16 can be embodied within or external to CPU 12.

Northbridge 14 provides an interface between components clocked at dissimilar rates. According to one embodiment, northbridge 14 interfaces a slower PCI bus and a faster CPU bus. Northbridge 14 may also contain a memory controller which allows communication to and from system memory 18. A suitable system memory 18 comprises DRAM or synchronous DRAM ("SDRAM"). Northbridge 14 may also include graphics support to allow communication to a graphics accelerator and buffer 20. A graphics support, included within an advanced graphics port such as the Accelerated Graphics Port (AGP), provides a high performance, component level interconnect targeted at three dimensional graphics display applications and is based on performance extensions or enhancements to PCI.

AGP interfaces are generally standard in the industry, the description of which is available from Intel Corporation. Generally speaking, AGP is physically, logically, and electrically independent of the PCI bus and is intended for the exclusive use of a display device 22. Display 22 is any electronic display upon which an image or text can be presented. A suitable display 22 includes a cathode ray tube (CRT), a liquid crystal display (LCD), etc.

Northbridge 14 is generally considered an application specific chip set, or application specific integrated circuit (ASIC) that provides connectivity to various buses, and integrates other system functions such as memory interface and P1394. System memory 18 is considered the main memory and refers to a portion of addressable memory that the majority of memory accesses target. System memory 18 is considered the largest continuous memory space of computer 10.

Northbridge 14 contains various sub-components, some of which serve as an interface to processor 12, system memory 18 and the graphics accelerator or frame buffer associated with display 22. A PCI interface is also included within northbridge 14 to allow accesses to and from input/output (I/O) devices 24 connected to the PCI bus.

Also connected to the PCI bus is a southbridge 26. Southbridge 26, similar to northbridge 14, includes various interfaces or controllers connected to respective buses. In the example shown, a controller or interface exists within southbridge 26 to handle communication between devices on the PCI bus, the IDE bus, the ISA bus and the $I^2C$ bus. The controllers, or interface units, serve to adapt transfer protocols from one bus to that of another. The interfaces also provide buffers to handle what could be substantially dissimilar transfer rates between buses.

Associated with each bus is a device, some of which do not need to be secured and some of which do. For example, the IDE bus includes peripheral devices 28, a popular IDE device being an IDE hard disk drive. Of course, numerous other peripheral devices may be connected to the IDE bus, and thereby granted access to computer system 10. In the example shown, an ISA bus is also connected to southbridge 26. According to known terminology, various controllers of multiple ISA type devices can be embodied upon a single monolithic substrate, deemed a super I/O 30. For example, a floppy drive 32, as well as keyboard 34, and the serial/parallel ports are coupled to the ISA bus via controllers within super I/O 30. Information regarding super I/O 30 can be obtained from, e.g., National Semiconductor Corp. For example, super I/O 30 can embody a real time clock (RTC) and a battery-backed CMOS RAM memory 32. The CMOS RAM memory, henceforth referred to as "CMOS" stores system configuration information and keeps track of the time of day (i.e., RTC). Of further significance, CMOS 32 may include a password that is maintained even if power to computer 10 is terminated. As will be described herein below, protection against accessing that password can be regulated by a system administrator and, more particularly, the security system hereof.

Further coupled to southbridge 26 is at least one $I^2C$ bus. The $I^2C$ bus is a fairly well documented peripheral bus having a recognized and understood bus transfer protocol, similar to the ISA bus and the IDE bus. An $I^2C$ bus typically contains a serial data line and a serial clock line. The $I^2C$ bus is therefore a bi-directional, two-wire communication system between different devices or modules. Before data is transmitted on the $I^2C$ bus, the device which should respond is addressed first. The addressing is always carried out with the first byte transmitted after the start procedure. Multiple $I^2C$ devices can be linked to each $I^2C$ bus. For example, many microcontrollers can be coupled to each bus and, as shown, a device bay controller 38 and at least one electrically erasable, non-volatile memory 40 can also be connected.

Device bay controllers are generally well known, and contain an interface which couples between the $I^2C$ bus and a device which can be removably coupled to the controller. For example, a CD ROM, tape drive, etc., can be removably coupled to pins on the device bay controller to allow data to be read from the removable device and placed across the $I^2C$ bus. Memory 40 includes any memory which is non-volatile and can be electrically erased and re-programmed. As such, memory 40 includes an EEROM, which can accommodate a password, similar to CMOS 32. For example, EEROM 40 and CMOS 32 may contain periodically programmed passwords. Those passwords should be secured, and should only be modified by a person or persons who have proper hierarchical authority. For example, a system administrator of a networked workstation may be granted access to EEROM 40 or CMOS 32, but not someone lower in the hierarchical status such as a user of that particular workstation.

Figure 2:
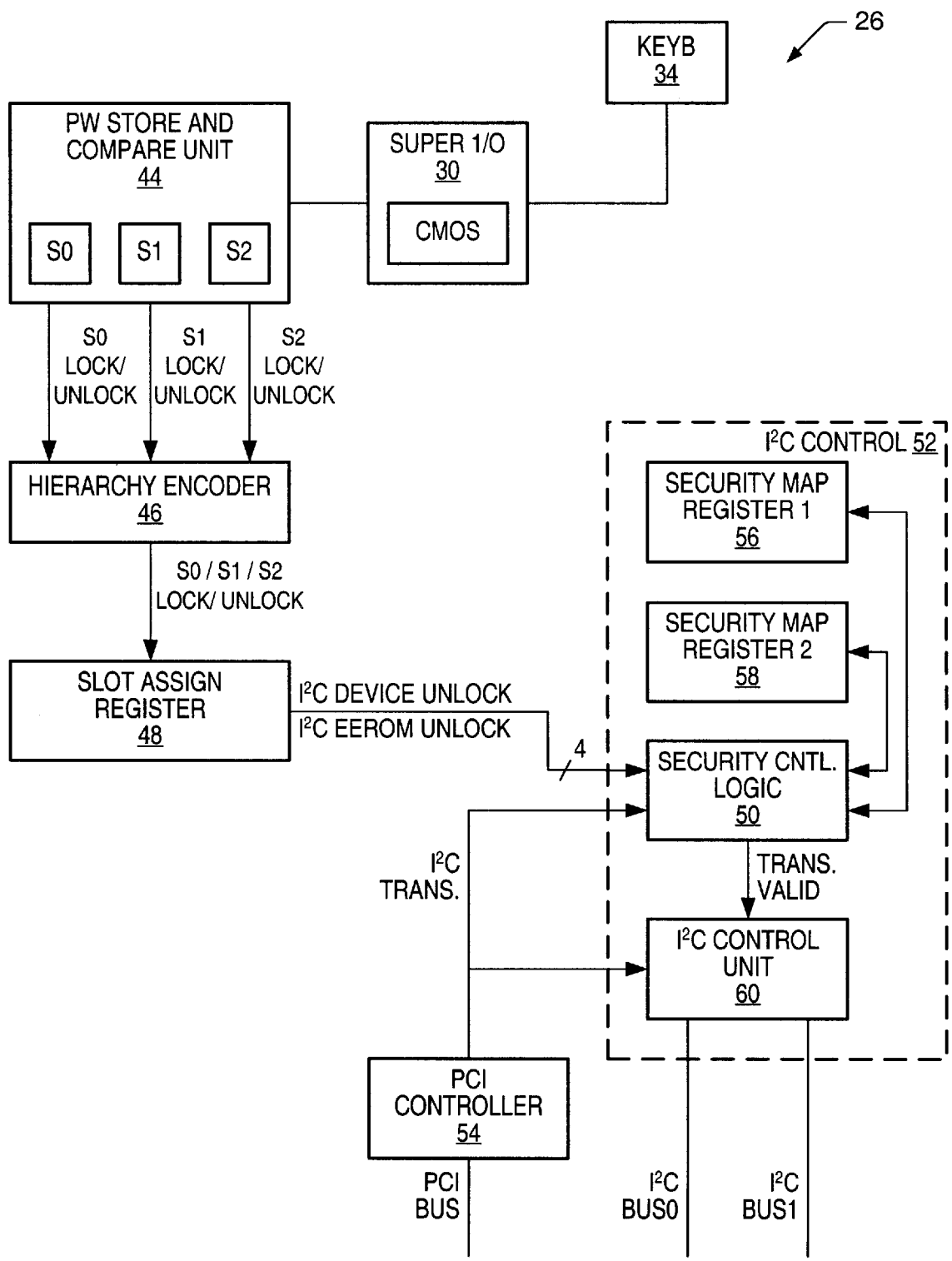
FIG. 2 is a block diagram of a bus interface unit coupled between various peripheral buses and having an I²C controller which prevents access to a securable I²C device if a lock signal is presented on a corresponding slot output from a password storage mechanism and slot assignment register.

FIG. 2 illustrates components of southbridge 26, as well as keyboard 34 and super I/O 30 coupled to southbridge 26. Passwords contained within non-volatile memory associated with the $I^2C$ bus are loaded during boot-up into volatile storage and comparator unit 44, alternatively dubbed "black box". Unit 44 preferably comprises a command register and a decoder, a data/status register, a register file, and password verification or comparator logic. Also included with unit 44 is at least one slot to which various devices are eventually coupled. In the example shown, three slots "S0", "S1", and "S2" are provided.

During boot-up from BIOS, passwords within CMOS 32 and EEROM 40 (shown in FIG. 1) are loaded into storage unit 44. The stored password is then subsequently compared against any passwords entered upon the computer keyboard. The desire to maintain security of passwords within EEROM 40 is pivotal on preventing unwarranted users from changing that password and thereby gaining access to critical information. If the keyboard-entered password matches with a previously stored password derived from non-volatile I²C memory then an unlock signal is presented on a respective slot.

In the example shown, three passwords can be stored and verified so that the comparison result (lock or unlock) is presented on a corresponding slot output. In most instances, a computer system can store numerous passwords, each possibly dedicated to only the user of that workstation, a system administrator who can access many computers in a network, including the present computer, and possibly a localized administrator who can access only a subset of the networked computers. Given the priority of the system administrator access over that of a single user, one slot may be dedicated solely to the system administrator matching outcome. In the example described herein below, that slot may be slot 2 or "S2". The outcome of a single user password verification can be of low priority and assigned to another slot, possibly slot 0 or "S0". Yet a further slot S1 can be dedicated to a localized administrator who can access only a subset of devices. The hierarchical nature of the slot outcomes proves beneficial if the system administrator wants to access all devices provided his or her password matches with his or her previously stored password. Thus, a hierarchy, chain, or priority scheme can be set up to provide less access to secured devices for some individuals and more to others.

A hierarchy encoder 46 is coupled to the output of unit 44 and specifically the slot conductor outputs. Given that S2 is higher priority than either S0 or S1, all S2 outputs are routed to lower priority slots by virtue of the encoding scheme set forth within encoder 46. Thus, any unlock signal upon slot S2 is routed as an unlock signal not only on slot S2, but also on the lower priority slots S0 and S1. Output from encoder 46 can be presented to a slot assignment register 48. Register 48 contains a plurality of fields, each of which comprises a series of bits. The bits are programmed during boot-up by retrieving a bit code from non-volatile memory into each field. Each field is assigned to a particular device, or a portion of that device. In the example shown, register 48 contains one field assigned to an I²C device such as a device bay controller. Three additional fields may be assigned to three separate portions of an address space attributed to I²C EEROM. Depending on which slot bears an unlock signal, and the hierarchical nature of that slot, an appropriate unlock signal will be routed across its respective slot and appropriately mapped via register 48 to a securable I²C device (either a memory or non-memory device).

The unlock signal forwarded from register 48 is used by security control logic 50 within I²C controller 52. Logic 50 also receives the addressing signal of an I²C transaction issued from a processor via a PCI bus and corresponding PCI controller 54. The address issued by the I²C transaction is then compared against an address stored in security mapping registers 56 and 58. The first address byte sent by the processor is often referred to as the "slave address". The slave address can either access a protected I²C device (provided that device is unlocked) or it can access an unprotected I²C device. More specifically, the slave address is defined as an address used to identify a device from among numerous devices connected to the I²C bus. The slave address can therefore be either an unprotected slave address or a protected slave address. Depending on whether a field within registers 56 or 58 identifies that address as being a protected slave address. More specifically, register 56 and 58 contain a plurality of fields, several of which have been programmed to identify all of the various protected devices (i.e., protected slave addresses). The fields within registers 56 and 58 can therefore automatically shadow, or track, address changes of related peripheral devices to prevent a potential security breach of unauthorized users who attempt to change a peripheral device address via, e.g., an indexed register modification.

After the slave address is issued by the master, the master can then submit a word address. The word address defines an address within the slave unit (i.e., I²C device) to which access is requested. Registers 56 and 58 may preferably contain a field which identifies certain word addresses as being within a protected range. As such, a word address can be a protected word address or an unprotected word address based on how that address compares with the beginning and ending word addresses programmed within registers 56 and 58.

Security control logic essentially comprises logic used to compare addresses within registers 56 and 58 with the incoming slave and word addresses issued by a master, such as the processor. Once it is determined that the slave address is not protected or the word address is not protected, then a transfer valid (or transaction valid) signal is sent from logic 50 to control unit 60. Control unit 60 thereby responds by forwarding the target or word address to the appropriate I²C bus. If the target/slave address is protected, then the transfer valid signal will only be sent if the device corresponding to that slave address is unlocked. Likewise, if the word address is protected, then the transfer valid signal will be sent only if the word address range which encompasses the word address is unlocked.

Figure 3:
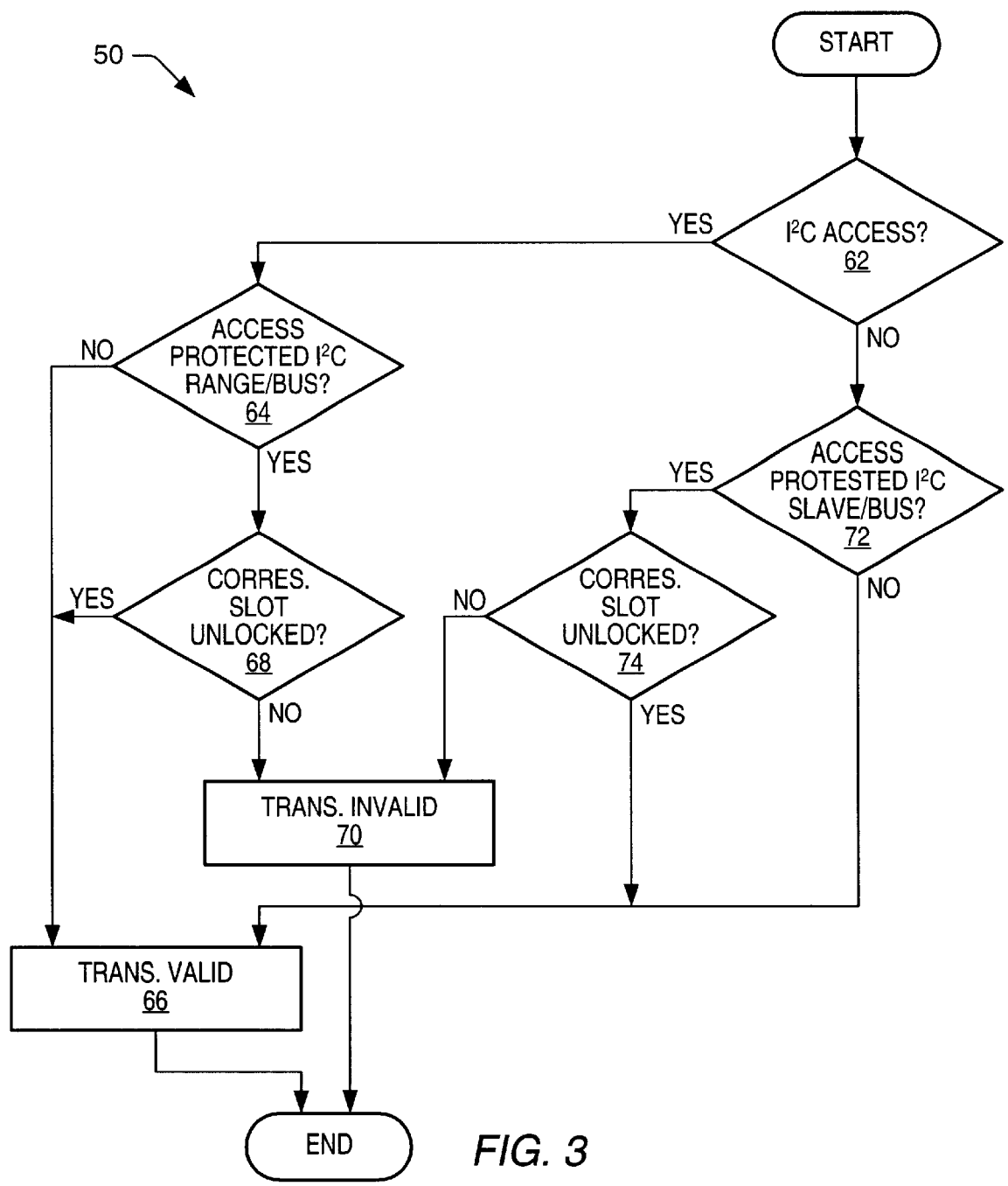
FIG. 3 is a flow diagram of logical operations carried forth by the security control unit of FIG. 2.

FIG. 3 illustrates a flow diagram of decisions made by security control logic 50. More specifically, logic 50 ascertains whether the target address corresponds to an I²C device, such as EEROM slave, as shown by reference number 62, by comparing that address against addresses stored within the security mapping registers. If access to the EEROM is intended, then determination 64 must be made whether the next address (i.e., word address) is to a protected I²C memory word address range, or bus. If not, then a transfer valid signal is forwarded at step 66. If the word address is intended to access a protected word address range, then examination of the slot assigned to the slave I²C device/address is needed. If that slot bears an unlock signal, then a transfer invalid signal (or de-asserted transfer valid signal) is sent at step 70.

If access to the EEROM is not intended, based on a comparison with bits stored within the mapping registers, then a determination 72 must be made whether the target address is slated for a protected I²C slave or I²C bus (whether the target address corresponds to a protected slave address). If the target address is not a protected slave address, then transfer valid signal will be sent. Conversely, if the target address is a protected slave address, then determination must be made whether the corresponding slot is unlocked 74. If unlocked, then transfer valid signal will be sent.

Figure 4:
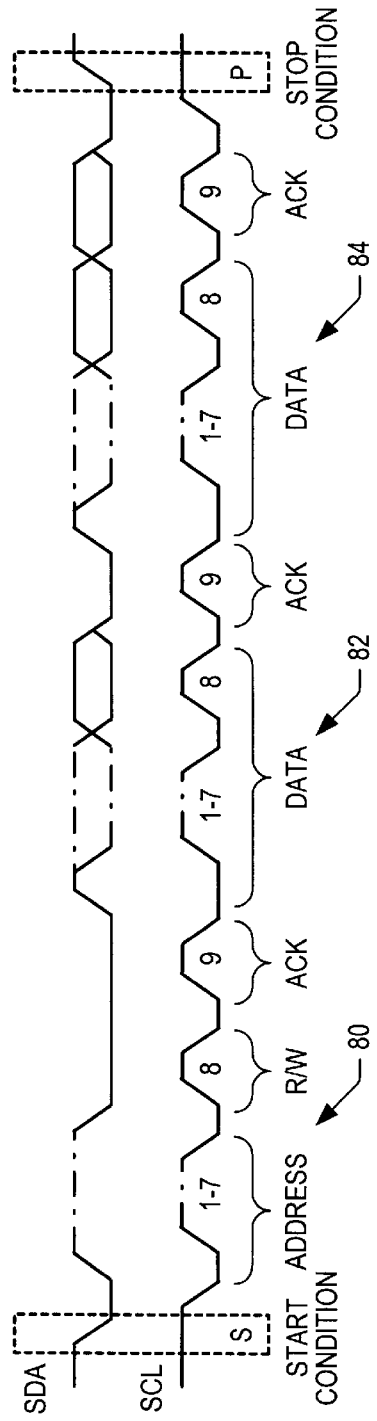
FIG. 4 is a timing diagram of protocol used to transfer address and data bytes across the I²C bus.

FIG. 4 exemplifies address/data transfer protocol used by an I²C bus. Each I²C bus comprises two wires, serial address/data (SDA), and serial clock (SCL). Each I²C device is recognized by a unique target address, and each device can operate as either a transmitter or receiver, depending on the function of that device. The device which initiates the transfer, generates clock signals and terminates transfer is referred to as a master, whereas the device being addressed by the master is termed a slave. The I²C bus is a multi-master bus, in that more than one device capable of controlling (mastering) the bus can be connected to the bus. Both SDA and SCL are bi-directional lines, connected to a positive supply voltage via a pull-up resistor. Every byte placed on the SDA line must be 8-bits long. The number of bytes that can be transmitted per transfer is unrestricted. Each byte has to be followed by an acknowledge bit. Accordingly, a transfer operation begins with a start condition signaled by a falling edge on SDA during a high clock cycle and culminating in a stop condition signaled by a rising edge of SDA during a high SCL signal. The first byte may be the target address consisting of 7-bits, followed by a data direction bit (R/W bar). An acknowledge bit is then sent by the master receiver after each byte has been received.

FIG. 4 illustrates the first byte 80 as being a target address. The second byte 82 can either be data or a word address. In instances where the I²C device contains addressable information, the second byte is typically a word address used to access a subset of bytes within that device. Thereafter, the next byte 84 comprises data either written to or read from the I²C device.

Figure 5:
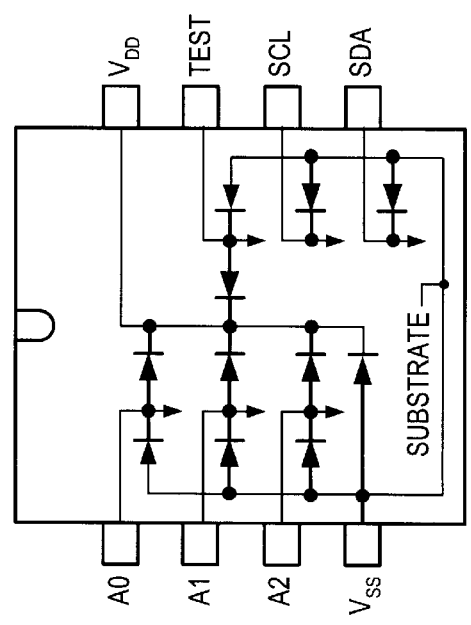
FIG. 5 is a plan view of a non-volatile I²C memory device pin-out having externally programmable address pins which form a portion of an address byte.

FIG. 5 illustrates a possible pin-out of non-volatile memory 88 connected to the I²C bus. The pin-out illustrates bi-directional wire SDA and SCL connection, as well as three address pins A0, A1, and A2. Pins A0–A2 are said to be programmed by either connecting those pins to power or ground.

Figure 6:
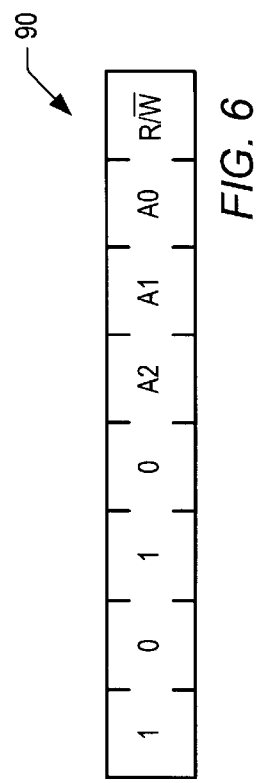
FIG. 6 is a plan view of an address byte containing both externally programmable address bits and fixed address bits corresponding to I²C memory access.

Referring to FIG. 6, a non-volatile memory slave address 90 is shown. For all memory units connected to the I²C bus, the most significant four bit slave address is fixed with a pattern 1010. The next three significant bits are programmed based on the pin tie-up or tie-down configuration described in FIG. 5. Accordingly, a slave address can be made up of a fixed and a programmable portion. Since it is likely that there will be several identical memory devices in a system, the programmable portion of the slave address enables the maximum number of such devices to be connected to the I²C bus. The number of programmable address bits of a device depends on the number of pins available. In the example shown, if a device has four fixed and three programmable address bits, a total of eight (i.e., $2^3$) identical non-volatile memory devices can be connected to the same bus. The fixed portion is hard-coded into the mapping registers as 1010. This signifies that any target address which has 1010 as the most significant bits, that target addresses is slated for a memory device, whereas address bits A2, A1, and A0 define the exact memory device being targeted from among multiple memory devices.

FIG. 7 illustrates an example of how the first security mapping register 56 can be programmed. FIG. 8 illustrates an example of how the second security mapping register 58 can be programmed. Each register includes a series of fields, wherein several fields within the second register are dedicated to mapping an incoming I²C target address to: (i) one of two possible I²C buses on which either device bay controller or an EEROM reside; (ii) a EEROM hard-coded device type (1010b) and pull-up/pull-down programmable (e.g., A2, A1 and A0) hardware address page; (iii) a target address of a device bay controller; (iv) the starting word address for protected ranges within either the EEROM or the device bay controller. The first mapping register contains fields which indicate the ending word address of the EEROM storage areas 0, 1, and 2, as well as the ending address of the protected range within the device bay controller. Of course, fields within the first and second mapping registers can be intermixed and attributed to different portions of those registers beyond that which is shown. All that is required, however, is that a target address be mapped to either a protected or unprotected device bay controller address or EEROM address, as well as the bus on which those devices reside. Moreover, mapping of a word address to a protected or unprotected range is also important given that each protected EEROM device can have multiple protected and unprotected word address ranges.

The first and second security mapping registers are write once registers. If modification is desired, the registers can only be written to during computer boot-up. Thereafter, the registers can only be read from and not modified. It would be appreciated to those skilled in the art having the benefit of this disclosure that the embodiments described above are believed to be capable of programmably securing any and all memory media containing the I²C-embodied passwords. Securing that memory media, or selectively securing portions of that memory media, prevents against unwarranted and unauthorized access to stored passwords. In so doing, devices meant to be secured remain secured unless they are properly unlocked by a legitimate user-entered password. Various modifications and changes may be made as would be obvious to a person skilled in the art having the benefit of this disclosure. It is intended that the following claims be interpreted to embrace all such modifications and changes and, accordingly, the specification and drawings are to be regarded in an illustrative rather than a restrictive sense.

What is claimed is:

1. A computer system incorporating a plurality of securable devices coupled to a two-line bi-directional bus, said computer system comprising:

a keyboard;

a storage unit operably coupled to the keyboard to produce an unlock signal upon an output conductor of the storage unit if a stored password within the storage unit favorably compares with a password entered upon the keyboard; and a controller coupled to the storage unit for allowing access to a first address of the securable device upon receiving the unlock signal and wherein access to a second address of the securable device is allowed regardless of whether the stored password compares with the password entered upon the keyboard.

2. The computer system as recited in claim 1, wherein the keyboard comprises any input device into which a user can forward a password.

3. The computer as recited in claim 1, wherein the controller comprises security control logic for discerning whether said first address of the securable device is a target address of a non-volatile memory.

4. The computer as recited in claim 1, further comprising a security mapping register having a field of bits against which said first address of the securable device is compared to determine whether said first address of the securable device is a target address of a non-volatile memory.

5. The computer as recited in claim 1, wherein the controller comprises security control logic for discerning whether said first address of the securable device is within a securable address range of a non-volatile memory.

6. The computer as recited in claim 1, further comprising another unlock signal produced upon another output conductor of the storage unit, and wherein the controller is coupled to the storage unit for allowing access to a third address of the securable device upon receiving the unlock signal.

7. The computer as recited in claim 1, further comprising a security mapping register having a field of bits against which said first address of the securable device is compared to determine whether said first address of the securable device is within a securable address range of a non-volatile memory.

8. The computer as recited in claim 1, wherein the two-line bi-directional bus is an inter integrated circuit ($I^2C$) bus.

9. A bus interface unit coupled to an inter integrated circuit ($I^2C$) bus upon which a plurality of $I^2C$ devices are connected, the bus interface unit comprising:

a storage unit configured to retain a stored password;

a security mapping register comprising a field of bits which identify a password secured device among the plurality of $I^2C$ devices;

a comparator coupled to the storage unit for comparing a user entered password against the stored password and to present an unlock signal from the comparator if the user entered password favorably compares with the stored password; and security control logic operably coupled between the comparator and the security mapping register for allowing access to the password secured device upon receipt of the unlock signal.

10. The bus interface unit as recited in claim 9, further comprising a second $I^2C$ bus upon which a second plurality of $I^2C$ devices are connected, and wherein the security mapping register comprises another field of bits which identify a second password secured devices among said second plurality of $I^2C$ devices, and wherein the security control logic is configured to allow access to the second password secured device upon receipt of the unlock signal.

11. The bus interface unit as recited in claim 9, wherein the password secured device comprises a device bay controller.

12. The bus interface unit as recited in claim 9, wherein the password secured device comprises non-volatile memory.

13. The bus interface unit as recited in claim 9, wherein the security mapping register comprises another field of bits which identify a secured address range within the password secured $I^2C$ device.

14. The bus interface unit as recited in claim 13, wherein the security control logic is coupled to allow access to the secured address range upon receipt of the unlock signal.

15. The bus interface unit as recited in claim 13, wherein the password secured $I^2C$ device comprises a plurality of secured address ranges, each of which are unlocked by a separate and distinct unlock signal.

16. A method for unlocking a plurality of password securable devices, comprising:

comparing a user-entered password against a stored password;

comparing a target address issued to an inter integrated circuit ($I^2C$) device against a field code within a security mapping register to determine if the target address is a password secured address; and presenting an unlock signal to the $I^2C$ device to de-assert lock thereof if the user-entered password is the same as the stored password and, if the user-entered password is not the same as the stored password, asserting lock only to the $I^2C$ device having the target address while the remaining plurality of password securable devices are unlocked and operable.

17. The method as recited in claim 16, wherein said comparing the user-entered password comprises depressing keys corresponding to the user-entered password on a keyboard locally or distally connected to the $I^2C$ device.

18. The method as recited in claim 16, further comprising programming bits within the field code corresponding to a password secured starting and ending address of the $I^2C$ device.

19. The method as recited in claim 16, further comprising fixing bits within the field code which identify the $I^2C$ device as a non-volatile memory.

20. The method as recited in claim 16, further comprising programming bits within the field code which identify the $I^2C$ device as coupled to one of two $I^2C$ buses.

* * * * *